United States Patent
Nitsan et al.

(10) Patent No.: US 10,530,835 B2
(45) Date of Patent: Jan. 7, 2020

(54) APPLICATION RECORDING

(71) Applicant: ENTIT SOFTWARE LLC, Sanford, NC (US)

(72) Inventors: Amichai Nitsan, Yehud (IL); Avi Saidian, Yehud (IL)

(73) Assignee: MICRO FOCUS LLC, Santa Clara, CA (US)

( * ) Notice: Subject to any disclaimer, the term of this patent is extended or adjusted under 35 U.S.C. 154(b) by 63 days.

(21) Appl. No.: 15/544,142

(22) PCT Filed: Jan. 29, 2015

(86) PCT No.: PCT/US2015/013548
§ 371 (c)(1),
(2) Date: Jul. 17, 2017

(87) PCT Pub. No.: WO2016/122535
PCT Pub. Date: Aug. 4, 2016

(65) Prior Publication Data
US 2018/0013814 A1    Jan. 11, 2018

(51) Int. Cl.
*H04L 29/08*  (2006.01)
*G06F 9/451*  (2018.01)
*G06F 9/445*  (2018.01)

(52) U.S. Cl.
CPC ........ *H04L 67/025* (2013.01); *G06F 9/44526* (2013.01); *G06F 9/452* (2018.02)

(58) Field of Classification Search
None
See application file for complete search history.

(56) References Cited

U.S. PATENT DOCUMENTS

| | | | |
|---|---|---|---|
| 7,966,604 B2 | 6/2011 | Tomar et al. | |
| 8,612,925 B1 | 12/2013 | Kunins et al. | |
| 9,438,491 B1* | 9/2016 | Kwok | H04L 43/065 |
| 2006/0005132 A1 | 1/2006 | Herdeg, III | |

(Continued)

FOREIGN PATENT DOCUMENTS

| EP | 1269321 B1 | 6/2008 |
|---|---|---|
| WO | WO-2013148870 A1 | 10/2013 |

OTHER PUBLICATIONS

International Search Report and Written Opinion; PCT/US2015/013548; dated Oct. 26, 2015; 11 pages.

(Continued)

*Primary Examiner* — Younes Naji (57) ABSTRACT

In one example of the disclosure, a graphic user interface is sent to a client system for display via a web browser. The graphic user interface is to enable receipt of a user instruction to commence recording of user actions made via the web browser upon a subject web application. Responsive to receipt of the user instruction, a key is caused to be sent via the web browser to a host system hosting the subject web application. The key and recording data indicative of user actions performed upon the subject web application via the web browser are received from the host system via the web browser. The key and the recording data are included within a web page or web pages of the subject web application. The key is utilized to access the recording data. The recording data is sent to the client system for display via the web browser.

15 Claims, 6 Drawing Sheets

(56) References Cited

U.S. PATENT DOCUMENTS

| | | |
|---|---|---|
| 2007/0027754 A1 | 2/2007 | Collins et al. |
| 2008/0120336 A1* | 5/2008 | Bergman ............ G06F 16/2458 |
| 2011/0208631 A1 | 8/2011 | Glick et al. |
| 2012/0204091 A1 | 8/2012 | Sullican et al. |
| 2014/0045483 A1 | 2/2014 | Whidden |
| 2014/0075364 A1* | 3/2014 | Bragdon ................... G06F 8/33 |
| | | 715/772 |
| 2014/0126708 A1* | 5/2014 | Sayko .................... H04M 11/00 |
| | | 379/93.01 |
| 2015/0177940 A1* | 6/2015 | Trevino ................. H04L 67/08 |
| | | 715/716 |

OTHER PUBLICATIONS

Weiss, D., Automated Integration Tests for Mobile Applications in Java 2 Micro Edition, (Research Paper), 2007, 10 pages http://dl.acm.org/citation.cfm?id=1759823.

Google, "Chrome DevTools", retrieved from the Internet on Dec. 17, 2018, 10 pages. <https://developers.google.com/web/tools/chrome-devtools/?utm_source=dcc&utm_medium=redirect&utm_campaign=2018Q2>.

* cited by examiner

APPLICATION RECORDING

BACKGROUND

Many services are delivered to consumers via web applications. In examples, these web applications may be composite in that several software components work in combination to fulfill the service. The components themselves may be distributed across various physical and virtual devices. For instance, a smartphone, tablet, notebook or other user computing device may serve as a client side user interface component. Through that user interface component, a user may initiate a series of actions carried to be carried out by the user computing device and by server side components to fulfill the service.

DETAILED DESCRIPTION

INTRODUCTION: For a provider of a web application, understanding the user experience and user satisfaction with the application are key factors to successful implementation. With such an understanding, the provider of the web application can better evaluate the success or likely success of the web application and how to invest resources for future development. An important issue in evaluating user experience and satisfaction can be the recording of test scripts for the purpose of identifying failed user interactions within the web application.

Typically, in order to record a test script of a web application accessed via a web browser, a user needs to install a component at the web browser or a computing device that hosts the web browser. In some cases where the test tool is a web application this may be security requirement—in some web browser systems one web application cannot access content of another web application absent installation of a browser add-on. Thus in examples wherein the test tool is run as a web application in a traditional web browser, the test application may be blocked from accessing a subject web application to be tested. After downloading and installing of a recording tool to complement the test tool, elevated permissions can be gained at the web browser and the test tool operating with the recording tool can in turn access the subject web page content and record the script. The downloaded recording tool is frequently a browser add-on or extension (that can run privileged code of the test web application), and may be part of an operating system add-on or upgrade.

However, requiring installation of a recording tool at the web browser or a computing device hosting the web browser has disadvantages. With a downloaded and installed recording tool, the user could be limited to recording test scripts against web applications utilizing the web browser to which the recording tool was installed. Further, a test application user utilizing a web browser with an add-on recording tool may not have the ability to record scripts while on the go, e.g., from another shared computer where the test user can't or won't install a recording tool locally at the shared computer. Further, with recording tools installed in web browsers, test users could be limited in ability to record scripts on some platforms, e.g., mobile device platforms where the included web browser does not support browser add-ons or extensions.

To address these issues, various examples described in more detail below provide a system and a method for application recording. In one example of the disclosure, a graphic user interface is sent to a client system for display via a web browser. The graphic use interface is to enable receipt of a user instruction to commence recording of user actions made via the web browser upon a subject web application. Responsive to receipt of the user instruction, a key is caused to be sent via the web browser to a host system that hosts the subject web application. The key and recording data indicative of user actions performed upon the subject web application via the web browser are received from the host system via the web browser. The received key and recording data are included within a web page or web pages of the subject web application. The key is in turn utilized to access the recording data and send the recording data to the client system for display via the web browser.

In another example of disclosed system and method for application recording, a graphic user interface is received at a client system from a developer system. The graphic user interface is an interface for display via a web browser. The graphic user interface is displayed at the client system. A user instruction is received the via the displayed graphic user interface, the user instruction including an instruction to record user actions made via the web browser upon a subject web application executing at the web browser. A key is received from the developer system, and the key is in turn sent to a host system that hosts the subject web application. A web page of the subject web application is received from the host system via the web browser. The web page includes the key and includes recording data indicative of user actions performed upon the subject web application via the web browser. The web page that includes the recording data is in turn sent to the developer system. After the developer system has utilized the key to access the recording data, recording data is received at the client system from the developer system and displayed.

In this manner, examples described herein can enable providers of software applications to, in an automated and efficient manner, provide users of web-based test applications the ability to initiate script recording of subject web applications without installation of a recording tool at the web browser or the computing device executing the web browser. The disclosed examples enable embedding of a dynamic recording tool within web pages of a subject web application, and provide for an efficient and automated ability to collect user action information and generate a replay script without client side configuration or installation. Providers of web-based application testing tools can enable users of the tools to generate new test scripts on-the-go (e.g., on public computing systems) as a pure web application. Thus, web-based testing application users', application developers', and application providers' satisfaction with products and services that provide for application script recording utilizing the disclosed examples, and with the physical and virtual devices that host or otherwise facilitate such application recording services, should increase. Further end user satisfaction with the subject software applications that are recorded (and subsequently improved as a result of the recordings) and the physical and virtual devices that are used to access or host such subject software applications, should increase.

The following description is broken into sections. The first, labeled "Environment," describes an environment in which various examples may be implemented. The second section, labeled "Components," describes examples of various physical and logical components for implementing various examples. The third section, labeled "Illustrative Example," presents an example of identification of application message types. The fourth section, labeled "Operation," describes steps taken to implement various examples.

Figure 1:
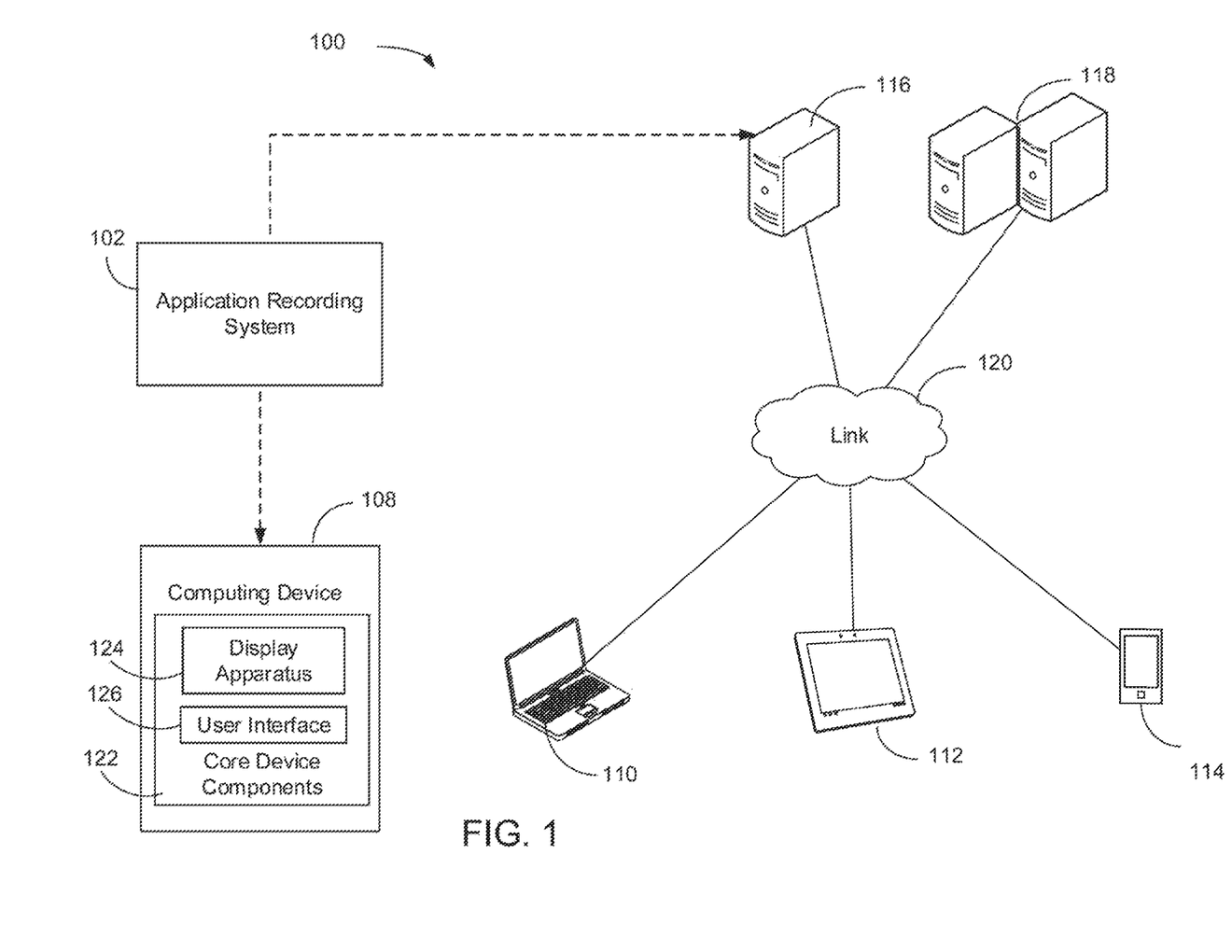
FIG. 1 is a block diagram depicting an example environment in which various examples of receipt of application recording data may be implemented.

ENVIRONMENT: FIG. 1 depicts an example environment 100 in which examples may be implemented as a system 102 for identification of application message types. Environment 100 is shown to include computing device 108, client devices 110, 112, and 114, server device 116, and server devices 118. Components 108-118 are interconnected via link 120.

Link 120 represents generally any infrastructure or combination of infrastructures to enable an electronic connection, wireless connection, other connection, or combination thereof, to enable data communication between components 108-118. Such infrastructure or infrastructures may include, but are not limited to, one or more of a cable, wireless, fiber optic, or remote connections via telecommunication link, an infrared link, or a radio frequency link. For example, link 120 may represent the internet, one or more intranets, and any intermediate routers, switches, and other interfaces. As used herein an "electronic connection" refers generally to a transfer of data between components, e.g., between two computing devices, that are connected by an electrical conductor. A "wireless connection" refers generally to a transfer of data between two components, e.g., between two computing devices, that are not directly connected by an electrical conductor. A wireless connection may be via a wireless communication protocol or wireless standard for exchanging data.

Client devices 110, 112, and 114 represent generally any computing device with which a user may interact to communicate with other client devices, server device 116, and/or server devices 118 via link 120. Server device 116 represents generally any computing device to serve an application and corresponding data for consumption by components 108-118. Server devices 118 represent generally a group of computing devices collectively to serve an application and corresponding data for consumption by components 108-118.

Computing device 108 represents generally any computing device with which a user may interact to communicate with client devices 110-114, server device 116, and/or server devices 118 via link 120. Computing device 108 is shown to include core device components 122. Core device components 122 represent generally the hardware and programming for providing the computing functions for which device 108 is designed. Such hardware can include a processor and memory, a display apparatus 124, and a user interface 126. The programming can include an operating system and applications. Display apparatus 124 represents generally any combination of hardware and programming to exhibit or present a message, image, view, or other presentation for perception by a user, and can include, but is not limited to, a visual, tactile or auditory display. In examples, the display apparatus 124 may be or include a monitor, a touchscreen, a projection device, a touch/sensory display device, or a speaker. User interface 126 represents generally any combination of hardware and programming to enable interaction between a user and device 108 such that the user may effect operation or control of device 108. In examples, user interface 126 may be, or include, a keyboard, keypad, or a mouse. In some examples, the functionality of display apparatus 124 and user interface 126 may be combined, as in the case of a touchscreen apparatus that may enable presentation of images at device 108, and that also may enable a user to operate or control functionality of device 108.

System 102, discussed in more detail below, represents generally a combination of hardware and programming to enable application recording. In some examples, system 102 may be wholly integrated within core device components 122. In other examples, system 102 may be implemented as a component of any of computing device 108, client devices 110-114, server device 116, or server devices 118 where it may take action based in part on data received from core device components 122 via link 120. In other examples, system 102 may be distributed across computing device 108, and any of client devices 110-114, server device 116, or server devices 118. For example, components that implement receipt of a user instruction to commence recording of user actions made via the web browser upon a subject web application, causing sending of a key via the web browser to a host system hosting the subject web application, and receiving a web page or web pages that include the key and recording data indicative of user actions performed upon the subject web application via the web browser may be included within computing device 108. Continuing with this example, components that implement utilizing the key to access the recording data and sending the recording data to the client system for display via the web browser may be components included within a server device 112. Other distributions of system 102 across computing device 104, client devices 106-110, server device 112, and server devices 114 are possible and contemplated by this disclosure. It is noted that all or portions of system 102 to enable application recording may also be included on client devices 106, 108 or 110.

Figure 2A:
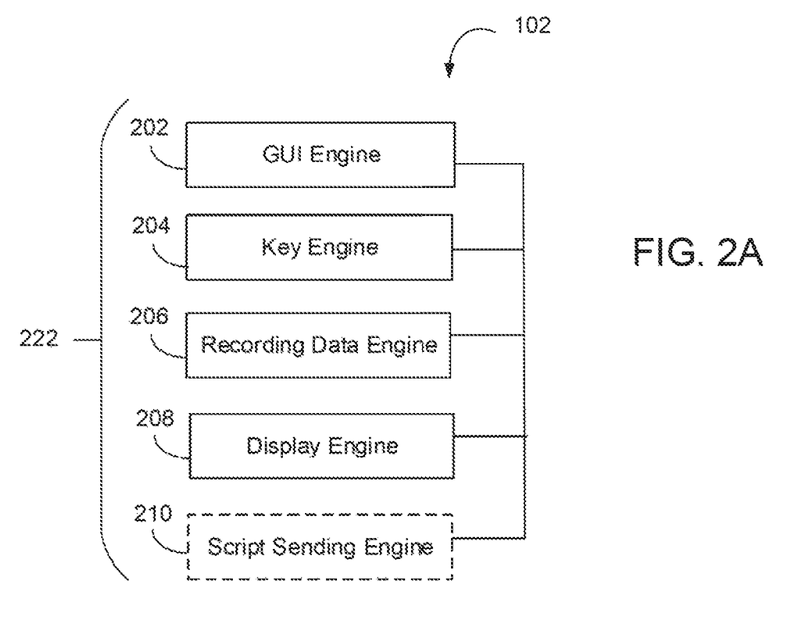
FIGS. 2A and 2B are block diagrams depicting examples of a system to enable application recording.
Figure 2B:
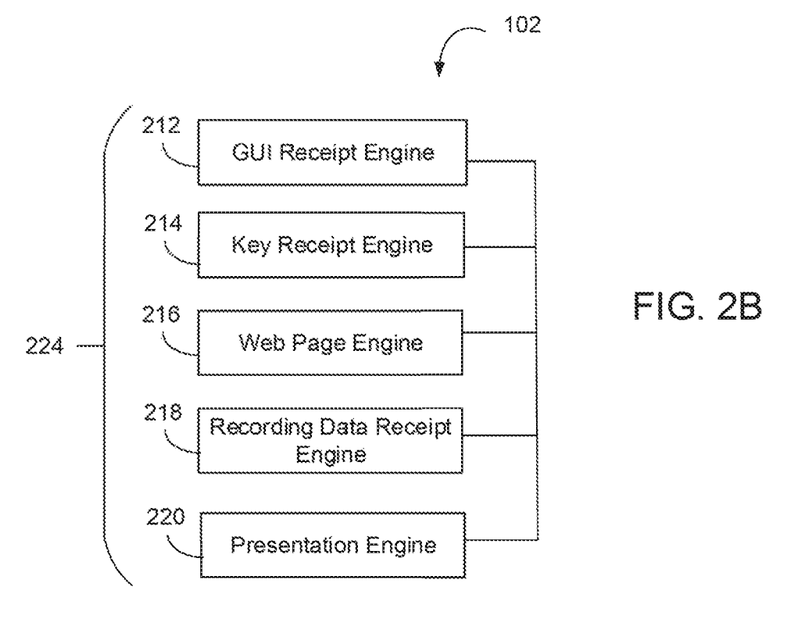

COMPONENTS: FIGS. 2A, 2B, 3A, and 3B depict examples of physical and logical components for implementing various examples. In FIGS. 2A and 2B various components are identified as engines 202, 204, 206, 208, 210, 212, 214, 216, 218, and 220. In describing engines 202-220 focus is on each engine's designated function. However, the term engine, as used herein, refers generally to a combination of hardware and programming to perform a designated function. As is illustrated later with respect to FIGS. 3A and 3B the hardware of each engine, for example, may include one or both of a processor and a memory, while the programming may be code stored on that memory and executable by the processor to perform the designated function.

FIG. 2A is a block diagram depicting components of a system 102 for application recording. In this example, system 102 includes GUI engine 202, key engine 204, recording data engine 206, display engine 208, and script sending engine 210. In performing their respective functions, engines 202-210 may access a data repository, e.g., any memory accessible to system 102 that can be used to store and retrieve data.

In an example, GUI engine 202 represents generally a combination of hardware and programming to send a graphic user interface to a client system for display via a web browser. The graphic user interface is sent to the client system to enable receipt of a user instruction to commence recording of user actions made via the web browser upon a subject web application. As used herein, "graphic user interface" and "GUI" are used synonymously, and refer generally to any type of display caused by an application that can enable a user to interact with the application via visual properties of the display. As used herein, "display" refers generally to an exhibition or presentation caused by a computer for the purpose of perception by a user, e.g., via presentation at a computer monitor, touchscreen, or other electronic display device. As used herein, "client system" refers generally to a computer component or set of computer components that accesses, via a network, an application or service made available, e.g., by another computer system. As used herein, "web browser" and "browser" are used synonymously and refer generally to a software application configured to enable a computer to traverse sites or information (e.g., a web page) on a network (e.g., an Internet or intranet). As used herein, "software application" and "application" are used synonymously and refer generally to a web application, software application, firmware application, or other programming that executes at, or accessible at, a computing device. As used herein, a "web application" refers generally to a computer software application that is coded in a browser-supported language (such as XML, HTML, or HTML with JavaScript) and is reliant on a web browser application to render the application executable or presentable. Examples of web pages that may include or facilitate web applications are webmail pages, online search engine pages, online sale pages, auction sites pages, and wiki pages. As used herein, "recording" user actions made at a web application refers generally to making a record of user interactions with the web application. In certain examples, the record may include a screencast or screenshots (e.g., a series of screenshots).

Continuing with the example of FIG. 2A, key engine 204 represents generally a combination of hardware and programming to, responsive to receiving the commence recording user instruction that was made via the web browser, cause sending of a key via the web browser to a host system that hosts the subject web application. As used herein, "key" refers generally to data or programming to authenticate, identify, or validate, including authentication, identification or validation of a computing device, machine, individual, transaction, service, process or thing. As used herein, "host system" refers generally to a computer component or set of computer components that makes an application or service available via a network to one or more other computer systems. In an example, the key sent by key engine 204 is a key to indicate to the hosting system an authorization to record the subject web application hosted by the host system. In a particular example, key engine 204 receives the key from the client system via the web browser prior to key engine 204 causing sending of the key to the host system via the web browser.

In an example, the subject web application may include a script to, responsive to receipt of the key from system 102, create recording data indicative of user interactions with the subject web application made via the web browser, and to cause the host system to send the recording data to system 102 via the web browser. As used herein, a "script" refers generally to any computer program, including, but not limited to, a small program (e.g., up to a few thousand lines of code) and/or a program written in domain-specific languages. In a particular example, system 102 may include a script sending engine 210 to send the script to the host system in advance of the key engine 204 sending the key to the host system.

Continuing with the example of FIG. 2A, recording data engine 206 represents generally a combination of hardware and programming to receive, from the host system via the web browser, the key and recording data indicative of user actions performed upon the subject web application via the web browser. As used herein, "recording data" refers generally to data indicative of user actions made at a web application. In certain examples, the recording data may include a screencast or a screenshot indicative of user interaction with the subject web application. The key and the recording data are included within a web page or web pages of the subject web application. In certain examples, recording data engine 206 receives the key and the recording data, included within a web page or web pages, from the host system at a point after the key engine 204 sent the key to the host system. In examples, key engine 204 sending the key to the host system can be a trigger that causes the host system to send system 102 the web page or web pages that include the key and recording data Continuing with the example of FIG. 2A, display engine 208 represents generally a combination of hardware and programming to utilize the received key to access the recording data, and to send the recording data to the client system for display via the web browser. Accordingly, display engine 208 can access the recording data without any requirement of a downloading or installation of a recording tool, e.g., a browser add-on or browser extension to enable recording of the subject web application, at the web browser.

In an example, the GUI sent by GUI engine 202 to the client system is a GUI that, in addition to being a GUI to enable receipt of the user instruction to commence recording of user actions, is to enable receipt of a user designation of the subject web application. In an example, the user instruction and the user designation of the subject web application may be received via a recording instruction widget included with the GUI. In this example, key engine 204 is to send the key to the host system responsive to receipt of the user instruction and the user designation entered at the GUI via the recording instruction widget. As used herein, a "recording instruction widget" refers generally to an element of a GUI that is provides an interaction point for a user to communicate an instruction to commence recording of user actions upon the subject web application and/or to identify the subject web application for recording. In examples, the recording instruction widget may be include, but is not limited to, an interactive button, an interactive text field, a list box, a check box, a dropdown list, a table control and/or another interface.

FIG. 2B is a block diagram depicting components of a system 102 for application recording. In this example, system 102 includes GUI receipt engine 212, key receipt engine 214, web page engine 216, recording data receipt engine 218, and presentation engine 220. In performing their respective functions, engines 212-220 may access a data repository, e.g., any memory accessible to system 102 that can be used to store and retrieve data.

In an example, GUI receipt engine 212 represents generally a combination of hardware and programming to receive at a client system, from a developer system, a GUI for display via a web browser at the client system. As used herein, a "developer system" refers generally to a computer component or set of computer components that the client system may communicate with, via a network, to gain access to an application or service made available by the developer system that is distinct from a subject web application that is hosted by a host system. In examples, the client system may communicate with the developer system to obtain access to a software development application or service hosted at the developer system. In a particular example, the software development application hosted by the developer system is an integrated development environment application.

The GUI received by GUI receipt engine 212 is to be displayed at the client system via a web browser. In an example, the displayed GUI may include a "Record" button or other instruction to commence recording of a subject web application that is executing at or being accessed via the web browser. Following display of the GUI at the web browser, the client system receives, via the GUI, a user instruction to record user actions made via the web browser upon the subject web application.

Continuing with the example of FIG. 2B, key receipt engine 214 represents generally a combination of hardware and programming to receive a key from the developer system and send the key to the host system that is hosting the subject web application. The key is to authorize recording of the subject web application.

Continuing with the example of FIG. 2B, web page engine 216 represents generally a combination of hardware and programming to receive, from the host system via the web browser, a web page of the subject web application. The received web page includes the key that the key receipt engine previously received from the developer system and sent to the host system. The received web page includes recording data indicative of user actions performed upon the subject web application via the web browser. Following receipt of the web page, web page engine 216 sends the web page that includes the recording data to the developer system. In examples, the key included within the web page may serve as an identifier for the recording data, such that the developer system can distinguish the recording data for the subject web application from recording data for other software applications.

Continuing with the example of FIG. 2B, recording data receipt engine 218 represents generally a combination of hardware and programming to, after the developer system has utilized the key to access the recording data, receive the recording data from the developer system. Presentation engine 220 represents generally a combination of hardware and programming to, following receipt of the record data by recording data receipt engine 218, display the received recording data.

In a particular example, GUI receipt engine 212 is to cause display of the GUI at the client system via the web browser in a first browser display tab, and the presentation engine 220 is to contemporaneously with the display of the GUI cause a display of the recording data via the web browser in a second browser display tab. As used herein, a "browser display tab" refers generally to a graphical control element or design of the web browser display that allows multiple sub-windows or panels to be contained within a single primary window of a display. In examples, the browser display tabs can be interacted with by a user and serve as a navigational widget for switching between the GUI content included within the first browser display tab and the recording data display at the second browser display tab. In this example, to maintain data security, there is no sharing of data between the first and second tabs of the web browser.

With reference back to FIG. 1 in view of FIGS. 2A and 2B, in one example system 102 may include a developer component 222 that includes engines 202-210 operating on server device 116 (or one or more other devices shown or not shown in FIG.1) and/or a client component 224 that includes engines 212-220 operating on client device 112 (or one or more other devices not shown in FIG. 1). In other examples, system 102 may include engines 202-210 and/or engines 212-220 included within, or distributed across, any one or several of computing device 108, client devices 110-114, server device 116, or server devices 118.

In the foregoing discussion of FIGS. 2A and 2B, engines 202-220 were described as combinations of hardware and programming. Engines 202-220 may be implemented in a number of fashions. Looking at FIGS. 3A and 3B the programming may be processor executable instructions stored on a tangible memory resource 302 and the hardware may include a processing resource 304 for executing those instructions. Thus memory resource 302 can be said to store program instructions that when executed by processing resource 304 implement system 102 of FIGS. 2A and 2B.

Memory resource 302 represents generally any number of memory components capable of storing instructions that can be executed by processing resource 304. Memory resource 302 is non-transitory in the sense that it does not encompass a transitory signal but instead is made up of more or more memory components to store the relevant instructions. Memory resource 302 may be implemented in a single device or distributed across devices. Likewise, processing resource 304 represents any number of processors capable of executing instructions stored by memory resource 302. Processing resource 304 may be integrated in a single device or distributed across devices. Further, memory resource 302 may be fully or partially integrated in the same device as processing resource 304, or it may be separate but accessible to that device and processing resource 304.

In one example, the program instructions can be part of an installation package that when installed can be executed by processing resource 304 to implement system 102. In this case, memory resource 302 may be a portable medium such as a CD, DVD, or flash drive or a memory maintained by a server from which the installation package can be downloaded and installed. In another example, the program instructions may be part of an application or applications already installed. Here, memory resource 302 can include integrated memory such as a hard drive, solid state drive, or the like.

Figure 3A:
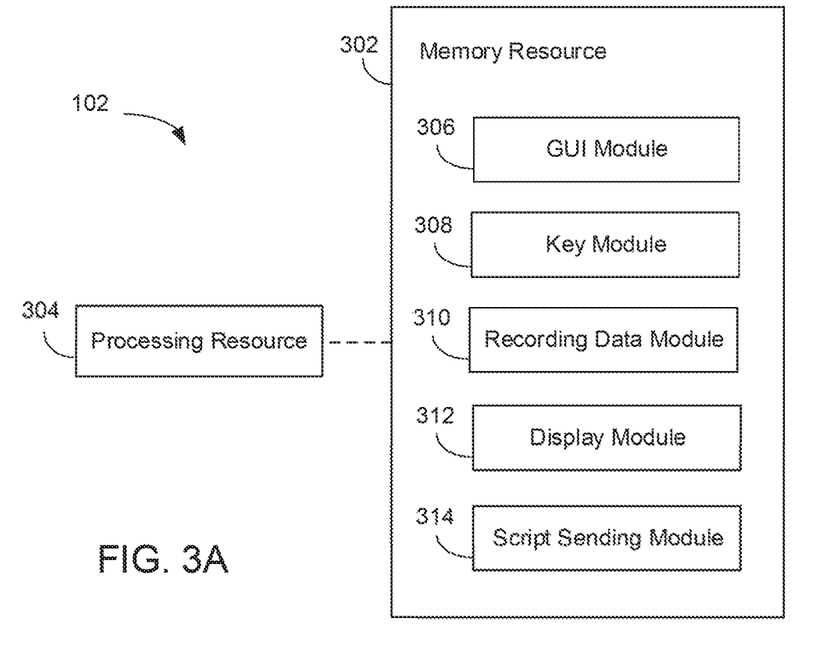
FIGS. 3A and 3B are block diagrams depicting a memory resource and a processing resource to implement examples of application recording.

In FIG. 3A, the executable program instructions stored in memory resource 302 are depicted as GUI module 306, key module 308, recording data module 310, display module 312, and script sending module 314. GUI module 306 represents program instructions that when executed by processing resource 304 may perform any of the functionalities described above in relation to GUI engine 202 of FIG. 2A. Key module 308 represents program instructions that when executed by processing resource 304 may perform any of the functionalities described above in relation to key engine 204 of FIG. 2. Recording data module 310 represents program instructions that when executed by processing resource 304 may perform any of the functionalities described above in relation to recording data engine 206 of FIG. 2. Display module 312 represents program instructions that when executed by processing resource 304 may perform any of the functionalities described above in relation to display engine 208 of FIG. 2. Script sending module 314 represents program instructions that when executed by processing resource 304 may perform any of the functionalities described above in relation to script sending engine 210 of FIG. 2.

Figure 3B:
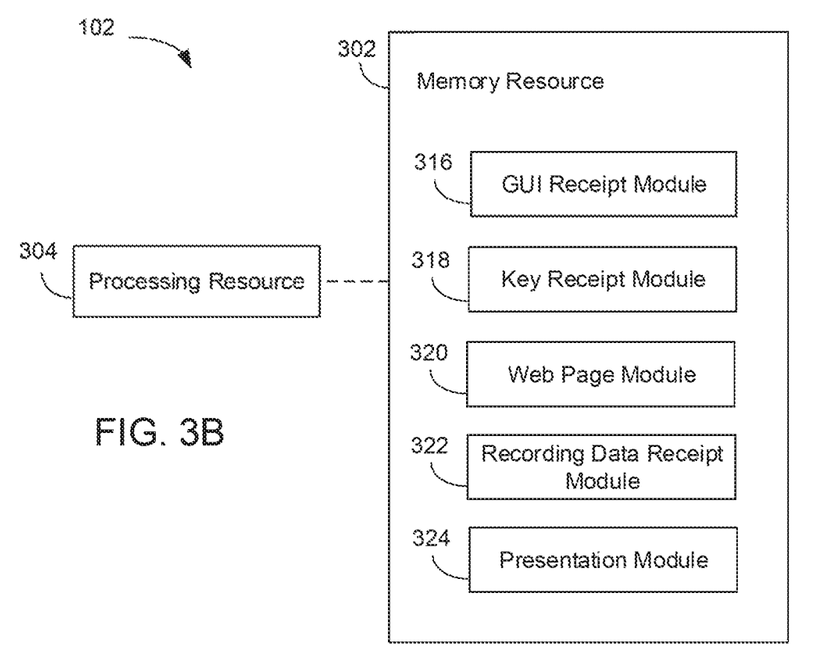

In FIG. 3B, the executable program instructions stored in memory resource 302 are depicted as GUI receipt module 316, key receipt module 318, web page module 320, recording data receipt module 322, and presentation module 324. GUI receipt module 316 represents program instructions that when executed by processing resource 304 may perform any of the functionalities described above in relation to GUI receipt engine 212 of FIG. 2B. Key receipt module 318 represents program instructions that when executed by processing resource 304 may perform any of the functionalities described above in relation to key receipt engine 214 of FIG. 2B. Web page module 320 represents program instructions that when executed by processing resource 304 may perform any of the functionalities described above in relation to web page engine 216 of FIG. 2B. Recording data receipt module 322 represents program instructions that when executed by processing resource 304 may perform any of the functionalities described above in relation to recording data receipt engine 218 of FIG. 2B. Presentation module 324 represents program instructions that when executed by processing resource 304 may perform any of the functionalities described above in relation to presentation engine 220 of FIG. 2B.

Figure 4:
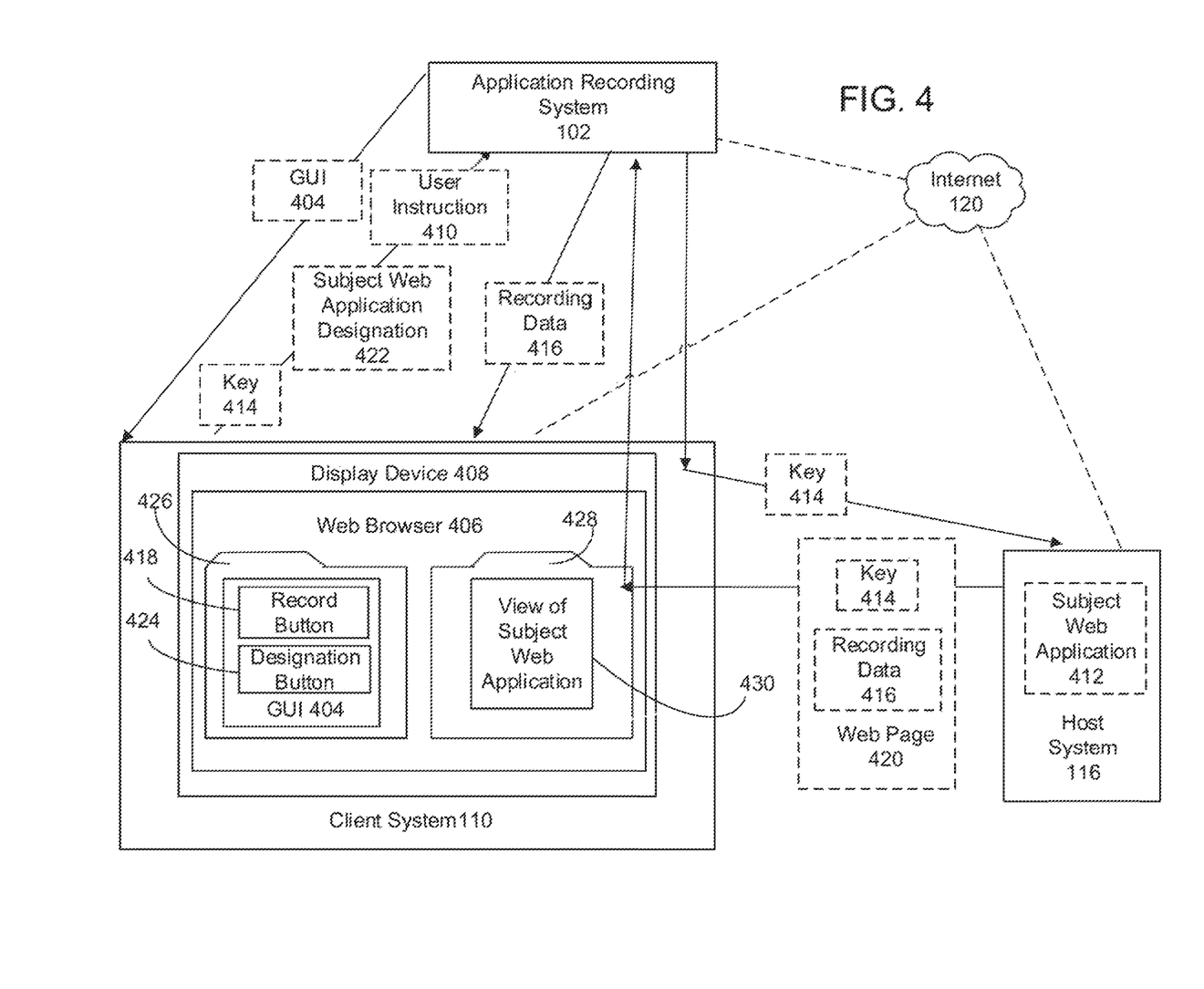
FIG. 4 illustrates an example of application recording including receipt of application recording data within web pages.

ILLUSTRATIVE EXAMPLE: FIG. 4, in view of FIGS. 1 and 2A, illustrates an example of system 102 enabling application recording including receipt of application recording data within web pages. In this example, application recording system 102 sends via an internet 120 a GUI 404 to a client system 110 for display via a web browser 406 executing at the client system 110. In this example the display is to be a presentation caused by the web browser 406 executing at the client system 110 (FIG. 1) for the purpose of perception by a user, with the presentation occurring at a computer monitor, touchscreen, or other electronic display device 408 included or connected to client system 110. The GUI 404 is sent for display via the web browser 406 at a first browser display tab 426.

The GUI 404 sent by system 102 to the client system 110 is to enable receipt by system 102 of a user instruction 410 to commence recording of user actions upon a subject web application 412 executing at a host system 116. The user instruction 410 was made via user interaction with a "Record Application" button widget 418 of the GUI 404 via the web browser 406 executing at client system 110. Also, in this example, the GUI 404 sent by system 102 to the client system 110 enables receipt of a user selection or other user designation 422 of the subject web application 412. In, this example, the user designation 422 of the subject web application may be received via a designation button 424 widget included with the GUI 404.

Continuing with the example of FIG. 4, system 102 receives the user instruction 410 and the subject web application designation 422 entered at the GUI 404 via the record button 418 and designation button 424 widgets. In this example system 102 also receives a key 414 from the client system 110 via the web browser. System 102, responsive to receiving the commence recording user instruction 410 and the subject web application designation 422 made via the web browser 406, causes sending of the key 414 via the web browser 406 to the host system 116 that hosts the subject web application 412. The key 414 sent by system 102 is a unique key authorization for recording of the subject web application 412 hosted by the host system 116.

In this example, system 102, responsive to system 102's receipt of the user instruction 410 and the subject web application designation 422 entered at the GUI 404 via the record button 418 and designation button 424 widgets, launches a view 430 of the subject web application 412 at a second display tab 428 at the web browser 406. In this example, for web browser security purposes there is no sharing of content or other data as between the first display tab 426 and the second display tab 428.

In this example, an administrator user at the host system 116 incorporated into the source code for the subject web application 412 a script. The script is to, responsive to receipt of the key 414 from system 102, cause host system 116 to create recording data 416 indicative of user interactions with the subject web application 412 made via the web browser 406. The script is also to cause host system 116 to send the recording data 416 to system 102 via the web browser.

Continuing with the example of FIG. 4, system 102 receives, from the host system 116 via second display tab 428 of the web browser 406, the key 414 and the recording data 416 indicative of user actions performed upon the subject web application 412 via the web browser 406. The recording data 416 may include a screencast indicative of user interactions with the subject web application. The key 414 and the recording data 416 are included within a web page 420 or web pages of the subject web application. System 102 sending the key 414 to the host system 116 can be a trigger that causes the host system 116 to send system 102 the web page 420 or web pages that include the key 414 and recording data 416.

Continuing with the example of FIG. 4, system 102 utilizes the received key 414 to access the recording data 416, and in turn sends the recording data 416 to the client system 110 for display via the second display tab 428 of the web browser 406. Accordingly, system 102 enables client system 110 to access the recording data 416 without any user initiated or automated downloading or installation of a browser add-on, browser extension, or other recording tool at the web browser 406.

Figure 5:
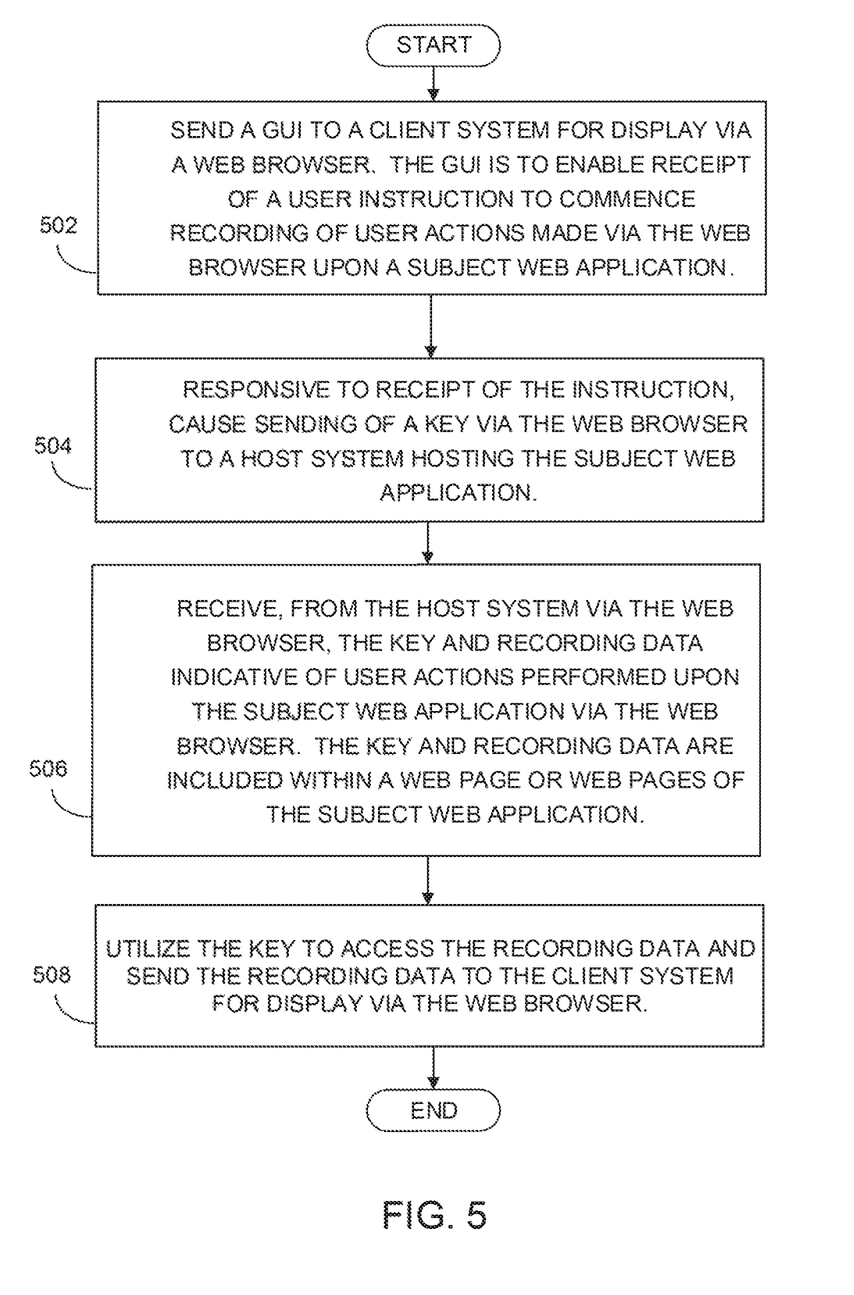
FIG. 5 is a flow diagram depicting steps taken to implement an example of application recording including receipt of application recording data within web pages.

OPERATION: FIG. 5 is a flow diagram of steps taken to implement a method for identifying application message types. In discussing FIG. 5, reference may be made to the components depicted in FIGS. 2A and 3A. Such reference is made to provide contextual examples and not to limit the manner in which the method depicted by FIG. 5 may be implemented. A GUI is sent to a client system for display via a web browser. The GUI is to enable receipt of a user instruction to commence recording of user actions made via the web browser upon a subject web application (block 502). Referring back to FIGS, 2A and 3A, GUI engine 202 (FIG. 2A) or GUI module 306 (FIG. 3A), when executed by processing resource 304, may be responsible for implementing block 502.

Responsive to receipt of the instruction, a key is caused to be sent via the web browser to a host system hosting the subject web application (block 504). Referring back to FIGS. 2A and 3A, key engine 204 (FIG. 2A) or key module 308 (FIG. 3A), when executed by processing resource 304, may be responsible for implementing block 504.

The key and recording data indicative of user actions performed upon the subject web application via the web browser are received from the host system via the web browser. The key and the recording data are included within a web page or web pages of the subject web application (block 506). Referring back to FIGS. 2A and 3A, recording data engine 206 (FIG. 2A) or recording data module 310 (FIG. 3A), when executed by processing resource 304, may be responsible for implementing block 506.

The key is utilized to access the recording data, and the recording data is sent to the client system for display via the web browser (block 508). Referring back to FIGS. 2A and 3A, display engine 208 (FIG. 2A) or display module 312 (FIG. 3A), when executed by processing resource 304, may be responsible for implementing block 508.

Figure 6:
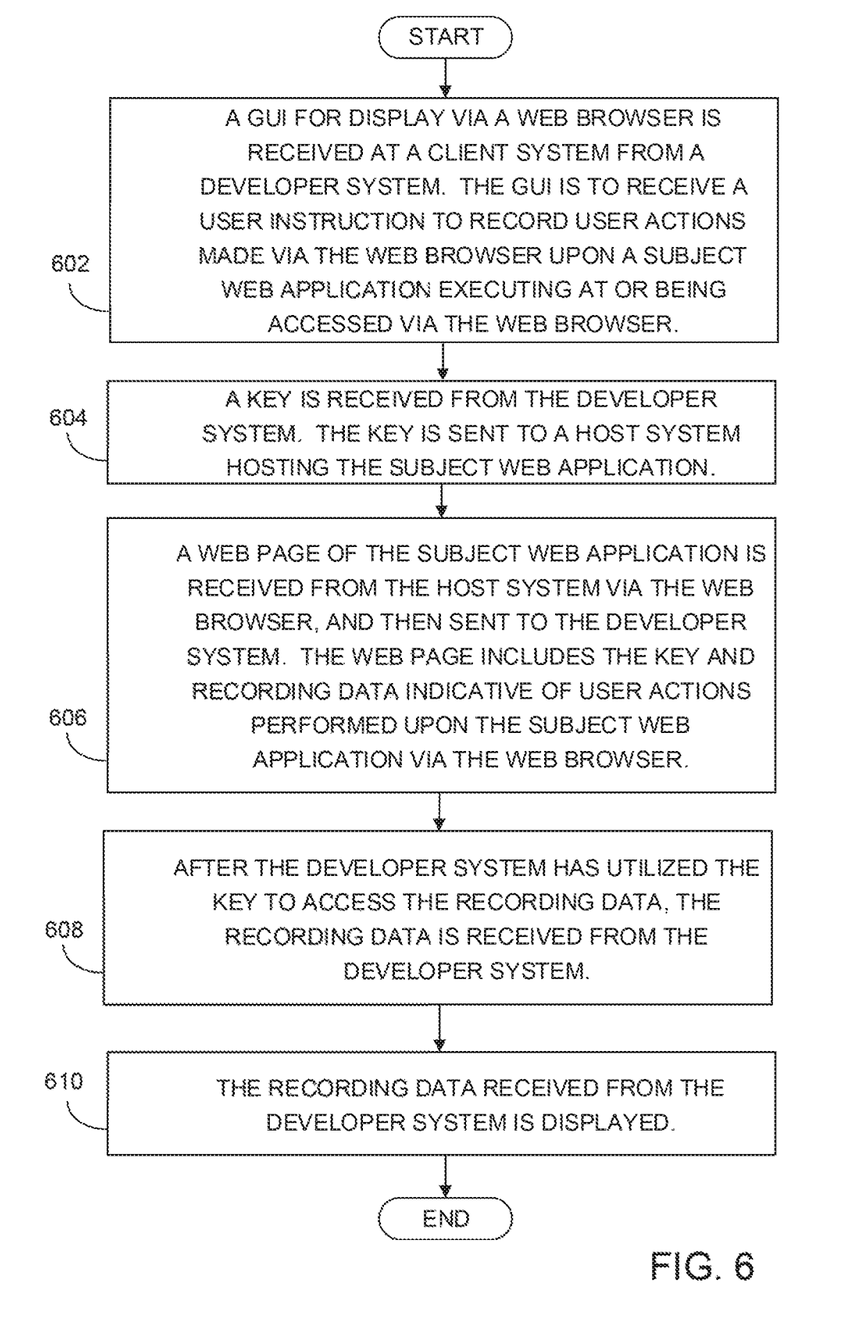
FIG. 6 is a flow diagram depicting steps taken to implement an example of application recording including receipt of application recording data within web pages.

FIG. 6 is a flow diagram of steps taken to implement a method for identification of application message types. In discussing FIG. 6, reference may be made to the components depicted in FIGS. 2B and 3B. Such reference is made to provide contextual examples and not to limit the manner in which the method depicted by FIG. 6 may be implemented. A GUI is received at a client system from a developer system. The GUI is for display via a web browser, and is to receive a user instruction to record user actions made via the web browser upon a subject web application executing at or being accessed via the web browser (block 602). Referring back to FIGS. 2B and 3B, GUI receipt engine 212 (FIG. 2B) or GUI receipt module 316 (FIG. 3B), when executed by processing resource 304, may be responsible for implementing block 602.

A key is received from the developer system and sent to a host system hosting the subject web application (block 604). Referring back to FIGS. 2B and 3B, key receipt engine 214 (FIG. 2B) or key receipt module 318 (FIG. 3B), when executed by processing resource 304, may be responsible for implementing block 604.

A web page of the subject web application is received from the host system via the web browser, and sent to the developer system. The web page includes the key and recording data indicative of user actions performed upon the subject web application via the web browser (block 606). Referring back to FIGS. 2B and 3B, web page engine 216 (FIG. 2B) or web page module 320 (FIG. 3B), when executed by processing resource 304, may be responsible for implementing block 606.

The recording data is received from the developer system after the developer system has utilized the key to access the recording data (block 608). Referring back to FIGS. 2B and 3B, recording data receipt engine 218 (FIG. 2B) or recording data receipt module 322 (FIG. 3B), when executed by processing resource 304, may be responsible for implementing block 608.

The recording data received from the developer system is displayed (block 610). Referring back to FIGS. 2B and 3B, presentation engine 220 (FIG. 2B) or presentation module 324 (FIG. 3B), when executed by processing resource 304, may be responsible for implementing block 608.

CONCLUSION: FIGS. 1-6 aid in depicting the architecture, functionality, and operation of various examples. In particular, FIGS. 1, 2A, 2B, 3A, and 3B depict various physical and logical components. Various components are defined at least in part as programs or programming. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s). Examples can be realized in any memory resource for use by or in connection with processing resource. A "processing resource" is an instruction execution system such as a computer/processor based system or an ASIC (Application Specific Integrated Circuit) or other system that can fetch or obtain instructions and data from computer-readable media and execute the instructions contained therein. A "memory resource" is any non-transitory storage media that can contain, store, or maintain programs and data for use by or in connection with the instruction execution system. The term "non-transitory" is used only to clarify that the term media, as used herein, does not encompass a signal. Thus, the memory resource can comprise any one of many physical media such as, for example, electronic, magnetic, optical, electromagnetic, or semiconductor media. More specific examples of suitable computer-readable media include, but are not limited to, hard drives, solid state drives, random access memory (RAM), read-only memory (ROM), erasable programmable read-only memory, flash drives, and portable compact discs.

Although the flow diagrams of FIGS. 5 and 6 show specific orders of execution, the orders of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present disclosure.

The present disclosure has been shown and described with reference to the foregoing examples. It is to be understood, however, that other forms, details and examples may be made without departing from the spirit and scope of the invention that is defined in the following claims. All of the features disclosed in this specification (including any accompanying claims, abstract and drawings), and/or all of the steps of any method or process so disclosed, may be combined in any combination, except combinations where at least some of such features and/or steps are mutually exclusive.

What is claimed is:

1. A developer system, comprising:
a processing resource; and a memory resource on which is stored instructions that, when executed by the processing resource, cause the processing resource to:
send a GUI from the developer system to a client system for display via a web browser of the client system, the GUI to enable receipt of a user instruction to commence recording of user actions made via the web browser upon a subject web application;
responsive to receipt of the user instruction, send a key from the developer system via the web browser to a host system hosting the subject web application, the key to cause recording of a test script, wherein the test script comprises the user actions performed upon the subject web application via the web browser;
receive, from the host system via the web browser, the key and recording data indicative of the user actions performed upon the subject web application via the web browser, wherein the key and the recording data are included within a web page or web pages of the subject web application; and
utilize the key to access the recording data and send the recording data from the developer system to the client system for display via the web browser.

2. The developer system of claim 1, wherein the instructions are further to cause the processing resource to enable access to the recording data without installation of a recording tool at the web browser.

3. The developer system of claim 1, wherein the subject web application includes a script to cause the host system to send the recording data.

4. The developer system of claim 3, wherein the instructions are further to cause the processing resource to send the script to the host system.

5. The developer system of claim 1, wherein the GUI is to enable receipt of a user designation of the subject web application, and wherein the instructions are further to cause the processing resource to send the key to the host system responsive to receipt of the user instruction and the user designation.

6. The developer system of claim 5, wherein the user instruction and the user designation are to be received via a recording-instruction widget.

7. The developer system of claim 1, wherein the instructions are further to cause the processing resource to receive the key and the recording data from the host system after the key is sent to the host system.

8. The developer system of claim 1, wherein the instructions are further to cause the processing resource to receive the key from the client system via the web browser prior to causing sending of the key to the host system via the web browser.

9. The developer system of claim 1, wherein the instructions are further to cause the processing resource to send the GUI to the client system for display via the web browser in a first browser display tab, and the subject web application is to execute during recording in a second browser display tab of the web browser.

10. The developer system of claim 9, wherein the subject web application is launched at the second browser display tab responsive to receipt of the user instruction and a user designation made via the first browser display tab.

11. The developer system of claim 10, wherein the instructions are further to cause the processing resource to receive the key and the recording data, as part of a page or pages of the subject web application, via the second browser display tab, and wherein there is no sharing of data between the first and second browser display tabs.

12. The developer system of claim 1, wherein the instructions to cause the processing resource to send the GUI, send the key, receive the key and the recording data, and send the recording data to the client system for display via the browser are included within an integrated development environment (IDE).

13. A memory resource storing instructions that when executed cause a processing resource to:
receive at a client system from a developer system a GUI for display via a web browser to display the GUI, and receive via the GUI a user instruction to record user actions made via the web browser upon a subject web application executing at or being accessed via the web browser;
receive a key from the developer system and send the key to a host system hosting the subject web application, the key to cause recording of a test script, wherein the test script comprises user actions performed upon the subject web application via the web browser; receive, from the host system via the web browser, a web page of the subject web application, and
send to the developer system the received web page, the received web page including the key and recording data indicative of the user actions performed upon the subject web application via the web browser;
after the developer system has utilized the key to access the recording data, receive the recording data from the developer system; and display the recording data received from the developer system.

14. The memory resource of claim 13, wherein the instructions are further to cause display of the GUI at the client system via the web browser in a first browser display tab, wherein the recording data is displayed via the web browser in a second browser display tab, and wherein there is no sharing of data between the first and second browser display tabs.

15. A method for receiving application recording data, comprising
sending, by a processing resource, a GUI from a developer system to a client system for display via a web browser of the client system, the GUI including a recording widget to enable receipt of a user designation of a subject web application and receipt of a user instruction to commence recording of user actions made via the web browser upon the subject web application;
responsive to receipt of the user designation and the user instruction, sending, by the processing resource, a key from the developer system via the web browser to a host system hosting the subject web application, the key to cause recording of a test script, wherein the test script comprises user actions performed upon the subject web application via the web browser, and wherein the subject web application is to include a script to cause the host system to send the application recording data;
receiving, from the host system via the web browser, the key and the application recording data indicative of the user actions performed upon the subject web application via the web browser,
wherein the key and the application recording data are embedded within a web page or web pages of the subject web application; and utilizing, by the processing resource, the key to access the application recording data and
sending the application recording data from the developer system to the client system for display via the web browser.

* * * * *